Patented Feb. 6, 1923.

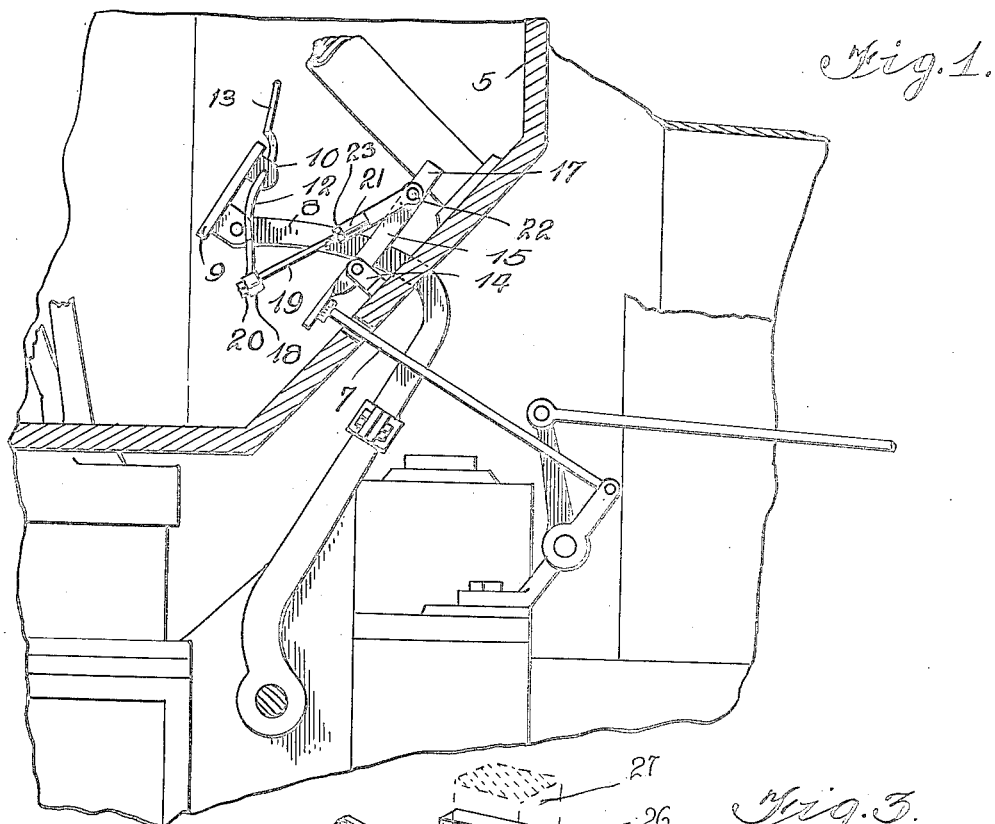
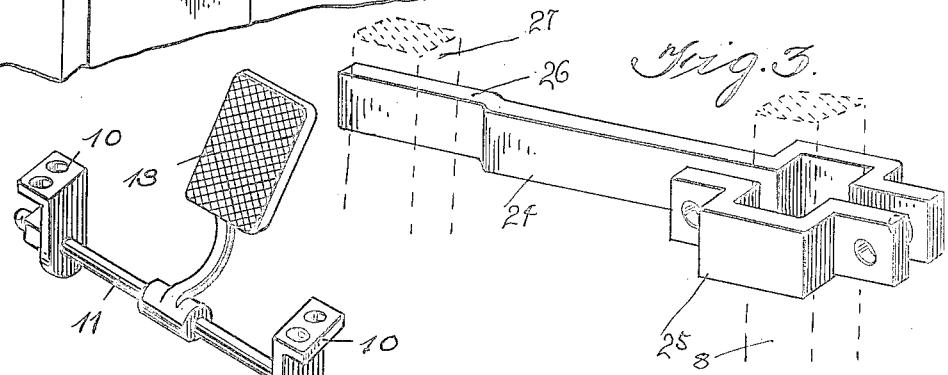
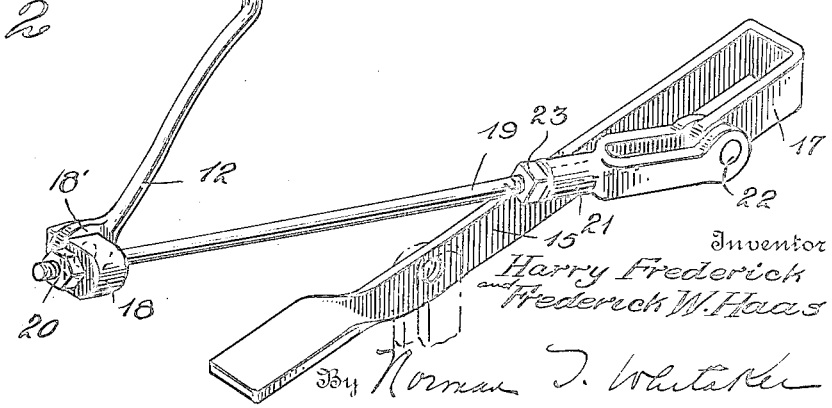

1,444,027

UNITED STATES PATENT OFFICE.

HARRY FREDERICK AND FREDERICK W. HAAS, OF ALLENTOWN, PENNSYLVANIA.

AUTOMOBILE ACCELERATOR CONTROL.

Application filed June 7, 1921. Serial No. 475,764.

*To all whom it may concern:*

Be it known that we, HARRY FREDERICK and FREDERICK W. HAAS, citizens of the United States, and residents of Allentown, in the county of Lehigh and State of Pennsylvania, have invented a new and useful Automobile Accelerator Control, of which the following is a specification.

Our invention relates to automobile accelerators and its principal object is to provide an accelerator control which may be operated while the operator's foot is in position for actuating the brake pedal, thus the danger of operating the accelerator control in applying the brakes in a case of emergency is obviated.

A further object of the invention resides in the provision of an accelerator control which will be automatically operated to cause the engine to slow up upon actuation of one of the foot pedals of the automobile.

Still another object of the invention resides in the provision of an accelerator control carried by one of the automobile foot pedals so that the speed of the engine may be controlled while the operator's foot is in position for actuating the foot pedal.

With the preceding and other objects and advantages in mind, the invention consists in the novel combination of elements, construction and arrangement of parts and operations to be more fully described hereinafter, claimed and illustrated in the accompanying drawing, wherein:

Figure 1 is a fragmentary view of an automobile equipped with the invention;

Figure 2 is a perspective of the invention removed from the automobile; and

Figure 3 is a perspective of the clutch pedal actuating arm.

Referring in detail to the drawing wherein similar characters of reference designate similar parts throughout the several views, the numeral 5 designates an automobile in general and includes the usual carbureter 6 and foot operated accelerator control rod 7 extending through the floor board of the automobile. The usual foot operated brake lever is designated at 8 while 9 designates the foot pedal thereof.

Our invention, as reduced to practive, comprises a bracket 10 riveted or otherwise secured to the under face of the brake pedal. Journaled in the bracket 10 is a rock shaft 11 having one end extended at right angles and rearwardly to provide a connecting arm 12, while its opposite end is extended at right angles and forwardly and is formed with an operating pedal 13, the latter being disposed slightly in advance of the pedal 9 so that it may be actuated while the operator's foot is in position to engage the pedal 9.

Mounted between the pair of upstanding bearings 14 mounted on the floor board of the automobile in proximity to the accelerator control rod 7, is a lever 15 having its rear end twisted to lie in a horizontal plane to engage the upper end of the accelerator control rod 7. The opposite end of this lever 15 is bent at right angles and extended reversely to afford an extension 17. The rear end of the connecting rod 12 terminates in an eye 18 having swivel connection with an element 18' rotatable on the rod 19. Disposed on the free end of this rod is a head or stop 20 to limit the movement of the element 18' in one direction. Adjustable on the opposite end of the rod 19 is a U-shaped yoke 21 having pivotal connection with the extension 17, as indicated at 22, the yoke 21 being locked in adjusted position by a jamb nut 23. In order to prevent stalling of the engine upon applying the brake an arm 24 is connected to the brake pedal by means of a strap 25. The outer end of the arm 24 is offset as at 26 and disposed in the path of the clutch pedal indicated at 27 so that upon actuation of the brake pedal the arm 26 will engage the clutch pedal 27 and disengage the clutch, thereby obviating the stalling of the engine.

From the disclosure it will be obvious that upon depressing the operating pedal 13 forwardly, the lever 15 will be rocked to swing the forward end thereof downwardly correspondingly pushing the rear end upward to release the accelerator control rod 7 to vary the charge from the carburetor 6.

It will be stated that the accelerator may be operated to cause the engine to run at a desired rate of speed by moving the foot operating member 13 forwardly to the required distance. With our invention, the operator's foot, at all times, will be in position to actuate the brake lever and the accelerator may be controlled without the removal of the foot from the vicinity of the brake lever.

It is to be understood that the form of our invention herein shown and described is to be taken as a preferred example of the same, and that various changes in the shape, size and arrangement of parts may be resorted to without departing from the spirit of the invention or the scope of the subjoined claims.

Having thus described our invention, what we claim as new and desire to secure and protect by Letters Patent of the United States, is:

1. The combination with a foot pedal and a reciprocating control member of an automobile extending through the floor board thereof, a pivoted member having one end disposed over the control member, and a foot operated lever carried by the first mentioned pedal and operatively connected with the pivoted member whereby to actuate the latter to operate the control member.

2. In a device of the character described, a foot operated lever, a reciprocatory accelerator control member, a rock shaft carried by the lever, a foot operated member carried thereby, a pivoted member having one end disposed over the reciprocatory control member and its opposite end operatively connected with the rock shaft.

3. In an automobile accelerator control, a reciprocatory control member, a foot lever, a rock shaft journaled on the foot lever and having one end extended rearwardly, a lever pivotally mounted adjacent the accelerator control and having one end engaged with the latter, and a rod connected with the rear end of the rock shaft and the opposite end of the lever.

4. The combination with a foot lever and a reciprocatory accelerator control rod, a bracket secured to the under face of the brake lever pedal, a rock shaft journaled therein and having one end extended rearwardly and its opposite end extended forwardly, a foot pedal carried by the latter, a pivoted operating member mounted in proximity to the accelerator control rod and having one end positioned against the latter, the opposite end of the pivoted member being bent at right angles and extended reversely, a rod connected with the rear end of the rock shaft, and a U-shaped yoke carried by the rod and having pivotal connection with the reversely disposed part of the lever.

5. A motor control device including a reciprocatory motor control member, a lever pivoted intermediate its ends and having one end overlying the motor control member, a manually operable lever, and means carried by the latter having operative connection with the opposite end of the first mentioned lever for actuating the same to operate the motor control member and to move the lever away from the motor control member upon actuation of the manually operable lever.

6. A motor control device including a reciprocatory motor control member, a lever pivoted intermediate its ends and having one end overlying the motor control member, a brake lever, and means carried thereby having operative connection with the opposite end of the first mentioned lever for acuating the same to operate the motor control member and to move the lever away from the motor control member upon actuation of the brake lever.

7. An automobile attachment including a member pivoted intermediate its ends and having one end overlying the automobile accelerator control member, an automobile control lever, manually operable means carried by the control lever and having operative connection with the opposite end of the pivoted member whereby to normally swing the pivoted member in a direction to operate the accelerator control member, the free end of the pivoted member being moved away from the accelerator control member upon actuation of the automobile control lever.

HARRY FREDERICK.
FREDERICK W. HAAS.